United States Patent
Mattos et al.

(10) Patent No.: US 10,142,016 B2
(45) Date of Patent: Nov. 27, 2018

(54) TECHNIQUES FOR HIGH-RESOLUTION LINE MONITORING WITH A STANDARDIZED OUTPUT AND AN OPTICAL COMMUNICATION SYSTEM USING THE SAME

(71) Applicant: Tyco Electronics Subsea Communications LLC, Eatontown, NJ (US)

(72) Inventors: Roberto Mattos, Morganville, NJ (US); Ralph Brian Jander, Freehold, NJ (US); Richard Kram, Ocean, NJ (US); Jonathan M. Liss, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/407,722

(22) Filed: Jan. 17, 2017

(65) Prior Publication Data
US 2018/0205455 A1   Jul. 19, 2018

(51) Int. Cl.
*H04B 10/071* (2013.01)
*H04B 10/073* (2013.01)
(Continued)

(52) U.S. Cl.
CPC ....... *H04B 10/0797* (2013.01); *H04B 10/071* (2013.01); *H04B 10/077* (2013.01); *H04B 10/07955* (2013.01); *H04J 14/0227* (2013.01)

(58) Field of Classification Search
CPC .................... H04B 10/071073; H04B 10/0731
See application file for complete search history.

(56) References Cited

U.S. PATENT DOCUMENTS 6,323,981 B1 * 11/2001 Jensen ................. H04B 10/071
                                                    398/11
6,414,775 B1 *  7/2002 Pedersen .............. H04B 10/071
                                                    398/177
(Continued)

FOREIGN PATENT DOCUMENTS

EP         1758279 A1    2/2007

OTHER PUBLICATIONS

International Search Report, Application No. PCT/IB2017/057645, International Filing Date, Dec. 5, 2017.

*Primary Examiner* — Shi K Li

(57) ABSTRACT

Techniques for providing high-resolution, standard-format output for line monitoring equipment (LME) of a wavelength division multiplexed (WDM) communication system is disclosed. LME may transmit a plurality of LME test signals via an optical path of the WDM system and perform gain measurements on reflections associated with the same at predetermined intervals. Gain measurements for each of the plurality of LME test signals may be normalized and filtered to derive LME peak data. The WDM communication system may perform full scans with data points totaling millions/billions (e.g., depending on system length, fiber type, and number of transmitted LME test signals or test pulses) and normalize the same into a relatively small number of resulting data points within the LME peak data. The WDM system may then output an LME results file in a standard format which is compatible with commercial viewers and optical time domain reflectometer (OTDR) equipment.

12 Claims, 5 Drawing Sheets

(51) Int. Cl.
*H04B 10/079* (2013.01)
*H04J 14/02* (2006.01)
*H04B 10/077* (2013.01)

(56) References Cited

U.S. PATENT DOCUMENTS

| | | | |
|---|---|---|---|
| 7,136,156 B1 * | 11/2006 | Quint | G01M 11/3136 |
| | | | 356/73.1 |
| 7,388,657 B2 | 6/2008 | Abbott | |
| 7,872,738 B2 | 1/2011 | Abbott | |
| 8,005,358 B2 | 8/2011 | Zhang et al. | |
| 8,009,983 B2 | 8/2011 | Zhang | |
| 2015/0171958 A1 * | 6/2015 | Webb | H04B 10/071 |
| | | | 398/37 |

* cited by examiner ized Output and an
TECHNIQUES FOR HIGH-RESOLUTION LINE MONITORING WITH A STANDARDIZED OUTPUT AND AN OPTICAL COMMUNICATION SYSTEM USING THE SAME

TECHNICAL FIELD

The present disclosure relates to optical communication systems that include line monitoring equipment (LME), and more particularly to techniques for performing high-resolution line scans to provide a high-level representation of the same in a standard format for system health monitoring applications.

BACKGROUND

In long distance optical communication systems it may be important to monitor the health of the system. For example, monitoring can be used to detect faults or breaks in the optical transmission cable, faulty repeaters or amplifiers, or other problems with the system. Known monitoring methods include use of optical time domain reflectometry (OTDR) equipment and techniques.

In more detail, and according to OTDR techniques, an OTDR signal source generates a test or probe signal, such as an optical pulse or a specially modulated optical carrier, and the test signal is launched into the outbound optical path of a path pair. Elements in the outbound path may reflect (e.g., backscatter) portions of the OTDR test signal. The backscattered signal portions may be returned (e.g., on the same outbound path or a different path such as the inbound path) and detected in an OTDR receiver. The transmission characteristics of each element in the path may also affect the amount of signal reflected at points after that element, for example, by attenuating the test signal or the reflected signal. The magnitude of the backscattered or reflected signal from each element or point along the optical path may be used as a metric for characterizing the optical path. Coherent optical time domain reflectometry (COTDR) is an enhancement of OTDR and may be used in long-haul WDM systems such as undersea optical communication systems. COTDR uses a special optical modulation scheme for its test signal and a coherent optical detection receiver to improve receiver sensitivity. The improved sensitivity enables measurement of very low levels of backscattered signal and thus the examination of very long optical fibers even if the fibers are in portions of the optical path far from the COTDR equipment (e.g., beyond an optical amplifier). Because Rayleigh backscatter from optical fiber in the transmission path can be detected by OTDR or COTDR, this approach to system monitoring provides a diagnostic tool that allows the user to examine the fiber between repeaters.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
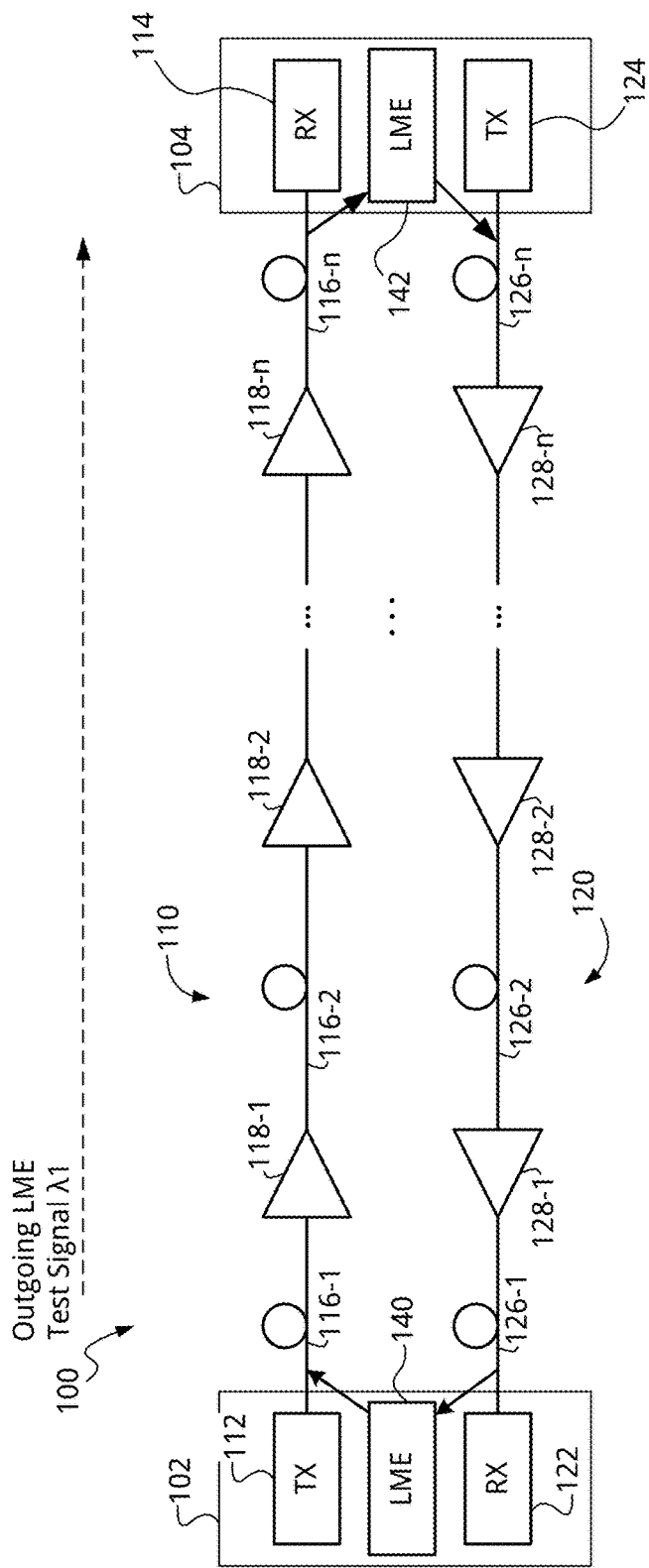
FIG. 1 is a simplified block diagram of one example embodiment of a system consistent with the present disclosure.

Techniques for providing high-resolution, standard-format output for line monitoring equipment (LME) of a wavelength division multiplexed (WDM) communication system are disclosed in accordance with the present disclosure. A WDM communications system in accordance with the present disclosure may transmit a plurality of LME test signals via an optical path (e.g., one or more fibers) and perform gain measurements on reflections associated with the same at predetermined intervals of, for example, 100 picoseconds or less. Gain measurements for each of the plurality of LME test signals may be normalized and filtered to present LME result data, which may also be referred to as LME peak data. To this end, the WDM communication system may perform full line scans with data points totaling millions/billions, (e.g., depending on system length, fiber type, and number of transmitted LME test signals or test pulses, and so on) and normalize the same into a relatively small number of resulting data points within the LME peak data. The WDM communication system may then output an LME results file in a standard format which is compatible with commercial viewers and optical time domain reflectometer (OTDR) equipment. The WDM communication system may directly output the LME results for diagnostic purposes to a USB thumb drive, portable hardware, network location, and so on.

Accordingly, a WDM communication system in accordance with the present disclosure may accurately measure gain imparted on optical test signals along an entire optical path, or portion thereof, to provide test measurements in a standardized, non-proprietary manner and at a resolution that is unavailable to other approaches to line monitoring such as standalone OTDR test devices. This may allow a WDM communication to provide a high-level representation of gain data for an entire length of a system (or a portion thereof) that may span tens of thousands of kilometers, or more.

The high-level representation advantageously allows for data points to be visualized in a number of ways to, for example, "zoom in" to isolate and display gain data representing portions of a system to easily and accurately identify areas of interest. As the spatial resolution of the gain data may be about 100 meters, or less, exact position of cable events such as cable cuts and component failure, for example, may be easily determined by automated software processes and/or trained technicians. For instance, a technician or software process may attribute a detected event to a particular component (e.g., an optical repeater, branching unit, and so on) of the communication system by virtue of the distance of the event relative to the start of the system (e.g., a cable landing station) and the associated measured gain level. In addition, the WDM communication system may output a result file in a standard format that also includes proprietary system parameters such as nominal wavelength for each LME test signal, duration of each pulse width, and so on, that commercial viewers may use as metadata for providing meaningful information regarding system health and diagnostics.

Turning to the Figures, FIG. 1 is a simplified block diagram of one exemplary embodiment of WDM transmission system 100 consistent with the present disclosure. In general, the system 100 may be configured to calculate a gain value associated each repeater/amplifier, branching unit, and so on. Variation in the gain may be used to generate a system alarm indicating a fault in the system or to provide an indication to a user that a fault condition is occurring, for example.

The WDM transmission system 100 or system 100 has been depicted as a highly simplified point-to-point system form for ease of explanation, although other embodiments are within the scope of this disclosure. The techniques and architectures described herein may be used with a wide variety of network components and configurations, and a given system may include multiple repeaters, spans of varying lengths, and/or other components such as transceivers at terminals of the system. Embodiments of the present disclosure are not intended to be limited to any particular such componentry and/or configurations.

As shown, system 100 may include terminals (or terminal stations) 102, 104 coupled by two unidirectional optical paths 110, 120, which together form a bi-directional optical path pair. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Optical path 110 may carry optical data on a plurality of channels (or wavelengths) in one direction from a transmitter 112 in the terminal 102 to a receiver 114 in the terminal 104. Optical path 120 may carry optical data on a plurality of channels (or wavelengths) in a direction opposite from the direction associated with path 110 from a transmitter 124 in the terminal 104 to a receiver 122 in the terminal 102. With respect to terminal 102, the optical path 110 is an outbound path and the optical path 120 is an inbound path. With respect to terminal 104, the optical path 120 is an outbound path and the optical path 110 is an inbound path. Optical path 110 and 120 may be long distance optical fiber lines for deployment, for example, in and/or across a body of water. The portion of the system disposed in a body of water, e.g. an ocean, may be referred to herein as the "wet plant."

Each of the optical paths 110, 120 may include associated amplifiers 118-1 to 118-N and 128-1 to 128-N, respectively. Optical amplifiers 118, 128 are illustrated in simplified form may include one or more erbium doped fiber amplifiers (EDFAs) or other rare earth doped fiber amplifiers, Raman amplifiers or semiconductor optical amplifiers.

Line monitoring equipment (LME) 140, 142 may be located in one or both of the terminals 102, 104 to provide line monitoring for the optical paths 110, 120. The LME 140, 142 may perform known signal generation, signal detection and processing functions and may include known transmitters, receivers, and processors configured to perform those functions. Monitoring equipment 140 may launch one or more test signals, e.g. at different wavelengths, into the optical path 110 (e.g., an outbound optical path). Monitoring equipment 140 may then receive and measure reflected signals. Monitoring equipment 142 may be configured substantially similar to that of LME 140 for the purpose of launching one or more test signals into optical path 120, for example. The LME 140 may be configured to loop back test signals received from LME 142 and vice-versa.

Each of LME 140 and 142 can be implemented with optical time domain reflectometry (OTDR) technology, and in one particular embodiment, both are capable of providing test signal wavelengths that exist at the edges of the passband of the repeaters, so as to not interfere with actual data signals, particularly if it is desired to carryout testing during system use (so called "in-service mode"), as opposed to testing carried out when no actual data traffic is present (so called "out-service mode"). However, in some cases only one of the LME 140 and 142 implements OTDR capabilities with the other simply providing a loopback for transmitted signals. In general, and as previously explained, reflected signals (e.g., Rayleigh signals) include information that allows the monitoring system to calculate parameters such as gain associated with the optical path (including repeaters, high loss loop back paths, fiber and other items in the optical path), or otherwise evaluate the optical path traveled by the test signals. Variation in the measured gain or other relevant parameters may be used to generate an alarm indicating a fault in the system.

From the perspective of LME 140, the outgoing fiber includes cable segments 116-1 to 116-N, and the incoming fiber includes cable segments 126-1 to 126-N. From the perspective of the LME 142, the outgoing fiber includes cable segments 126-1 to 126-N, and the incoming fiber includes cable segments 116-1 to 116-N. Consistent with an embodiment of the present disclosure, the system 100 allows test equipment 140 and 142 to select a particular signal reflected from either the outgoing fiber or the incoming fiber by adjusting the optical frequency of the test/probe signal.

Figure 2:
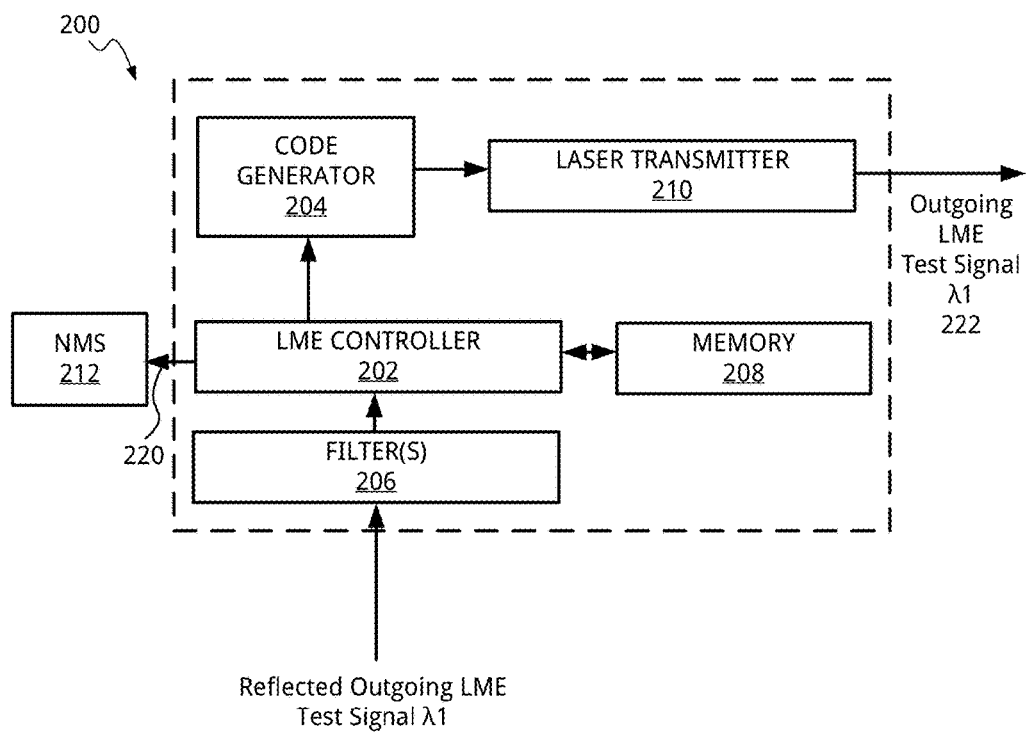
FIG. 2 is a block diagram that schematically illustrates example line monitoring equipment (LME) suitable for use in the example system of FIG. 1, in accordance with an embodiment of the present disclosure.

Turning to FIG. 2, with additional reference to FIG. 1, an example embodiment a LME 200 is shown in accordance with an embodiment of the present disclosure. The LME 200 may be suitable for use as the LME 140 and/or LME 142 of FIG. 1, for example. In the illustrated embodiment, the LME 200 includes a laser transmitter 210 for launching optical signals via, for example, optical paths 110/120.

The laser transmitter 210 may be a wavelength-division multiplexing (WDM) transmitter configured to transmit optical data on a plurality of channels (or wavelengths) over a fiber, e.g., a fiber within optical path 110/120, to a WDM receiver, e.g., LME 140/142. Laser transmitter 210 may include a plurality of laser transmitters each transmitting an optical data signal using a different channel or wavelength, and a multiplexer for combining the data signals into an aggregate signal transmitted over optical path 110/120. The receiver may demultiplex and detect the transmitted data signals. Alternatively, the laser transmitter 210 emits only a single channel of data to be carried on each of optical paths 110 and 120 for line monitoring purposes.

The LME 200 may be configured for monitoring the health of the system 100, e.g., as LME 140 and/or LME 142, and may be provided in a variety of configurations. In the illustrated embodiment, the LME 200 includes a code generator 204, a laser transmitter 210, a LME controller 202, a computer readable memory 208, and a filter 206. The LME 200 may be configured to provide an output 220 to a network management system (NMS) 212. The output may include, for example, a file in a standard format compatible with OTDR viewer/analyzer systems, which is discussed in further detail below in connection with FIG. 3. In other cases, output 220 may comprise LME measurements and the NMS 212 may use the same to produce an export file in a standard format compatible with OTDR view/analyzer systems.

One such example standard includes a format comporting with SR-4731 titled "Telecordia Special Report SR-4731" published in July of 2011. A user may request the output from the LME 200 via graphical user interfaces (GUIs) of the NMS 212, for example. Alternatively, or in addition, the NMS 212 may periodically request output from the LME 200 to perform automated health monitoring for the system 100.

The code generator 204 may be configured for generating and outputting a test code, such as a Golay Code having a fixed length. In other cases, the test code may include a pseudo-random sequence (PRS) of code. The output of the code generator 204 may be coupled to the laser transmitter 210.

The LME controller 202 comprises at least one processing device/circuit such as, for example, a digital signal processor (DSP), a field-programmable gate array (FPGA), Reduced Instruction Set Computer (RISC) processor, x86 instruction set processor, microcontroller, or an application-specific integrated circuit (ASIC). Aspects of the LME controller 202 may be implemented using, for example, software (e.g., C or C++ executing on the controller/processor 104), hardware (e.g., hardcoded gate level logic or purpose-built silicon) or firmware (e.g., embedded routines executing on a microcontroller), or any combination thereof. One or more of the plurality of LME processing stages of FIG. 3 may be implemented by the LME controller 202. In an embodiment, the LME controller may be configured to carry out the LME process 700 of FIG. 7, although this disclosure is not necessarily limited in this regard. For example, NMS 212 or other suitable computing system may perform one or more acts, e.g., acts 710 and 712.

The laser transmitter 210 may take a known configuration, e.g. a distributed feedback laser (DFB), and may be configured to produce an optical output at a carrier wavelength, e.g., λ0, that may be different from the wavelengths of all of the data channels to be transmitted on the transmission system 100. The carrier wavelength λ0 may, for example, be at an edge of the spectral bandwidth of the system or may be between data channels. In one embodiment, the laser transmitter 210 may be configured to provide an optical output at a plurality of different carrier wavelengths at different intervals of time. For example, the laser transmitter 210 may provide an output at a short LME wavelength at the short wavelength end of the data signal transmission band, i.e. adjacent the shortest wavelength data channel, and a long LME wavelength at the long wavelength end of the data signal transmission band, i.e. adjacent the longest wavelength data channel. In one embodiment, the short LME wavelength may be 1537 nm and the long LME wavelength may be 1563 nm. The power of the laser output may be set below the power level of the data signals communicated over optical paths 110/120 to minimize the impairment of the data signals in instances where LME wavelengths are measured in-service.

The laser transmitter 210 may generate an LME test signal, e.g. on both the long and short LME wavelengths, representative of the code received from code generator 204. The LME test signal may be provided as an LME test signal output 222. In one embodiment, the output of the code generator 204 may directly modulate the amplitude of the laser output. Other configurations for imparting the code to the output light from the laser transmitter are known. For example, the code may be imparted by an amplitude or other modulator coupled to an output of the laser transmitter 210.

The LME test signals returned to LME 200 by each repeater via optical path 116, for instance, are delayed from the original LME test signal 222 by a time period proportional to the distance traveled by the test signal 222. For the first repeater 118-1, for example, the time delay $t_{s1}$ is proportional to the distance $d_1$ from the transmitter 210 to the first repeater 118-1 via the span 116-1. The distance $d_1$ to the first repeater 118-1 may be calculated as the distance from the transmitter 210 to the first repeater 118-1 through cable segment 116-1, for example. This distance may also be accurately referred to as a delay path for the first repeater 118-1. At a time delay $t_{s2}$, with $t_{s2}$ being substantially twice that of delay $t_{s1}$, back reflection may be received at the LME 200, and more specifically the LME controller by virtue of filter 206. The time delay $t_{s2}$ for the LME test signal returned by the first repeater 36-1 may therefore be calculated as $t_{s2}=(d_1*2)/c$, where c is the speed of light within a particular medium, for example. Similarly, the time delay $t_{s3}$ for the LME test signal returned by the second repeater 118-2 can be calculated based on the known distance, $d_2$, of the delay path associated with the second repeater 118-2, and may be calculated as $t_{s3}=(d_2*2)/c$, where c is the speed of light within an optical path, e.g., an optical fiber. Likewise, time delays for additional repeaters in the system can also be calculated based on the known distances of their delay paths.

Similarly, other components such as branching units, couplers, and so on along with so-called "events" (e.g., cable cuts, component failure) along each of the optical paths 110/120 may result in reflection/backscatter of the test LME test signal. Each event may therefore be correlated to a particular distance from the LME 200 by virtue of the time delay of an associated reflected test signal.

During line test operations, the LME controller 202 may cause one or more test signals, e.g., test signal 222, to propagate via an optical path, e.g., optical path 110/120. The LME controller 202 may then perform gain measurements at a predetermined interval, e.g., 100 picoseconds. For example, during measurement cycling the LME 200 may measure power of one or more photodiodes and monitor the correlation to identify whether received signals correspond to a code previously sent. Thus each gain measurement may be stored in an array with the index being a multiple of the predetermined interval. A dedicated hardware clock of the LME controller 202, for example, may provide a high resolution timer capable of 100 picosecond resolution, or better. Depending on various characteristics of the system 100, a spatial resolution of 100 meters or better may be achieved based on known propagation times for optical signals, as discussed further below. The LME controller 202 may utilize electrical signals or optical signals representative of an event, or more particularly a reflected test signal associated with an event. Where the LME controller 202 uses electrical signals, the LME 200 may further include an optical-to-electrical converter connected between filter 206 and the LME controller 202 for converting the optical signals output by filter 206 into electrical signals.

Over a given test period, N number of reflections of the LME test signal may be received by the LME controller 202 based on the predetermined measurement interval and stored in the memory 208 during one round trip. In some cases, a plurality of LME test signals are sent, e.g., 10 billion/s, with round-trip results being stored in LME data sets, which may be expressed as:

$$D=\{d_1, d_2, \ldots, d_n\} \quad \text{Equation 1}$$

where N is a non-zero array index and D represents an associated gain value array. Note the particular rate of codes sent may be adjusted depending on a desired configuration. For example, while sending Golay Code at a rate of 1 microsecond per bit, a spatial resolution of 100 meters (10 microseconds/kilometer) may be achieved. Increasing data rates may proportionally increase spatial resolution. Different data rates may be chosen depending on a desired spatial resolution, hardware capability, optical network topology, and so on.

Each LME data set associated with a given test signal transmitted via an optical path of the system 100 therefore may include a substantially equal number of data points. The LME data sets D may be averaged and normalized using, for example, linear averaging and other suitable approaches. The averaging and normalizing process may advantageously reduce the noise floor and increase measurement reliability. The resulting normalized LME data set $D_{peaks}$ may be utilized in subsequent processing and fault detection, such as discussed further below with regard to FIG. 3.

The filtering and normalizing may occur as each LME data set $d_1 \ldots d_n$ is completed (e.g., a round-trip for a given LME signal has occurred), or may occur after a predefined period of time, e.g., after X number of LME test signals have completed a round-trip. The number of averages utilized, which is to say the total number of data sets D corresponding to one or more LME test signals, may be scaled in proportion to system length. For example, a greater number of averages may be utilized in the event of a relatively short system span of, for instance, 10 km. In the case of a long-haul span of up to 25 km, or more, a lesser number of averages may be utilized. The particular number of averages chosen may balance the need for reliable measurements versus the total amount of time to complete a particular number of round-trips. In any event, the plurality of data point arrays may be normalized using, for example, linear averaging or any other suitable averaging approach.

The total number of averages may be based on the following equation:

$$total n\_avg = 1000 \times CorrelationDuration/Max(20, SystemLength/(100+(CodeLen+TailLen) \times SpatialResolution \times 10/1000))$$ Equation(2)

where CorrelationDuration is the total duration of the test period, SystemLength is the length of the system in kilometers, CodeLen is the length of the LME test signal in bytes, TailLen is a fictitious length to represent a length of a system at an end, and SpatialResolution is the maximum resolution for an event. TailLen may be set to, for instance, 625 to represent 625 km, which this disclosure has identified through empirical analysis as suitable to compensate for far-end noise floors, although other TailLen values are within the scope of this disclosure. The resulting LME data set $D_{peaks}$ thus represents an average based on the total number of averages, with the total number of averages being calculated based on Equation (2).

Acquisition range, as used herein, refers to the total one-way length a pulse must take from the OTDR back to the end of a fiber being measured. The following equation may be used to determine an acquisition:

$$AcquisitionRange = 1.5 \times SystemLength \times \frac{10^{10}}{3 \times 10^5}$$ Equation (3)

The following equation may be used to determine User Offset (UO):

$$User\ Offset = \left(\frac{UO \times 1.469}{3 \times \frac{10^8 m}{s}}\right) \times 10^{12} ps/s$$ Equation (4)

where the UO is a one-way distance in meters from OTDR front panel to beginning of an optical link, e.g., an optical jumper length.

Figure 3:
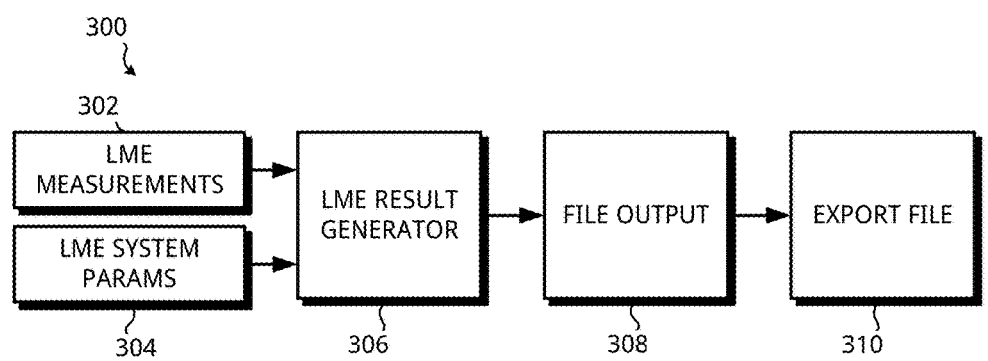
FIG. 3 is a block diagram that illustrates a plurality of processing stages that may be implemented by the example LME of FIG. 2, in accordance with an embodiment of the present disclosure.

Turning to FIG. 3, an example plurality of processing stages 300 is shown that may be implemented by the LME 200 to produce a LME result file, in accordance with an embodiment of the present disclosure. The LME result file may comport with a standard format, such as the Telecordia format as discussed above. The LME controller 202 may implement one or more LME processing stages, such as the plurality of processing stages 300. To this end, the processing stages may be implemented in a variety of ways including hardware, software, or a combination thereof.

The LME measurements 302 may include the resulting LME data set $D_{peaks}$, as discussed above. The LME measurements 302 may be provided to an LME result generator stage 306. LME system parameters 304 may include various user-configurable parameters and system-specific parameters. For example, LME system parameters may include general parameters (e.g., as summarized in Table 1 below), manufacturer-specific parameters (e.g., manufacturer name, OTDR mainframe ID, OTDR mainframe serial number, optical module ID, optical module serial number, software revision tags) and/or hardware parameters (e.g., as summarized in Table 2 below). The LME system parameters 304 may be presented via GUIs of the NMS 212 for viewing and modification purposes. Table 1 provides a summary of some example, non-limiting general parameters and Table 2 provides a summary of some example, non-limiting hardware parameters.

TABLE 1

General Parameters

| System Parameter | Description |
| --- | --- |
| Default language | Language associated with LME data (e.g., English, French, etc.) |
| Fiber ID | Defaults to 0x0020 |
| Fiber Type | e.g., single-mode fiber, multi-mode fiber |
| Nominal Wavelength | Wavelength associated with LME test signal, e.g., 1550 nm. |
| Originating Terminal Location | User-defined location string |
| Terminating Terminal Location | User-defined terminating terminal location |
| System Name | User-defined system name |
| Current Data Flag | NC = as built, RC = as-repaired condition; OT = other |
| User Offset | As calculated by Equation (3) |
| LME to BMH Distance | One-way distance from OTDR front panel to beginning of optical link |

TABLE 2

Hardware (Fixed) Parameters

| | |
| --- | --- |
| Date & Time Stamp | Date & timestamp, e.g., retrieved from a LME hardware file |
| Units of Distance | Kilometers, meters, feet, kilofeet, miles, and so on. |
| Actual Wavelength | Hardware default wavelength to use for LME test signal, e.g., retrieved from a LME hardware file |

TABLE 2-continued

Hardware (Fixed) Parameters

| | |
|---|---|
| Pulse Width Used | Pulse width in nanoseconds for LME test signal, e.g., retrieved from a LME hardware file |
| Data Spacing | The time increment between data points for each pulse width of a LME test signal. |
| Averaging Time | Time (e.g., in seconds) for averaging. |
| Acquisition Range | Total one-way length a pulse must take from the OTDR back to the end of a fiber being measured, e.g., measured in 100 picoseconds intervals, which may be calculated by Equation (2) above. |
| User Offset | Distance calculated from UO: (UO × 1.469)/3 × 10^8 ms) × 10^12 ps/s |
| LME to BMH Distance | One-way distance from OTDR front panel to beginning of optical link |
| Loss Threshold | Minimum optical power loss in dB that will be identified as a loss type fiber event in the optical fiber trace analysis. |
| End of Fiber Threshold | Minimum optical power loss in dB that will be identified as the end-of-fiber in the optical fiber trace analysis. |
| Trace Type | Standard (ST), Reverse (RT), Bidirectional (BT), difference (DT), reference (RF). |
| Acquisition Offset | Identifies the length of an optical fiber measured between the OTDR equipment optical port and the position corresponding to the first fiber trace data measurement. |
| Total # of Pulse Widths Used | The number of pulse widths used, e.g., the number of LME test signals transmitted |
| Group Index | Corresponds to the fiber's group index value reported to the fifth decimal place. Default value of 146800 shall be used as the GI for fiber used in the 1550 nm window. |
| Backscatter Coefficient | The coefficient of received backscatter. Varies depending on the fiber design and the wavelength of the LME measurement signal. |
| Front Panel Offset | One-way distance (e.g., in units of 100 psec) for distance to the fiber inside the front panel of OTDR. Used in part to establish the zero distance point and the insertion loss of the fiber/OTDR connection. |
| Noise Floor Level | Represents the logarithmic lower power level for which the OTDR trace can provide usable power data. |
| Reflectance Threshold | Represents the absolute value of the minimum reflectance in dB that will be identified as a reflectance type fiber event in the optical fiber trace analysis. |

The LME result generator stage 306 also receives the LME system parameters 304. The LME result generator stage 306 uses the LME measurements 302 in combination with the LME system parameters 304 to convert the LME measurements 302 into a plurality of gain values and an associated distance D in meters relative to the start of an optical path, e.g., the optical path 110/120. The following equation may be utilized to convert a timestamp associated with each data point into a distance value (in meters):

$$\text{Distance} = T \times C \quad \text{Equation (3)}$$

where T is the timestamp for a given event (e.g., index of the measured gain value multiplied by the predetermined measurement interval) and C is the speed of light. Note the speed of light C varies depending on the medium. To this end, the Fiber Type parameter may be examined and C may be adjusted according to a predefined optical fiber latency value associated with a particular Fiber Type and the selected nominal wavelength for the LME test signal. In a vacuum, or free space, light travels at rate of 299.792 meters per microsecond (s). In contrast, light moves through single-mode fiber at a lower rate due to an associated refractive index. For example, some types of single-mode fiber, e.g., G.652, allows light to travel at a rate of about 204.191 m/μs for channel wavelengths at about 1150 nm. Accordingly, the speed of light C may be adjusted based on known latencies associated with the particular Fiber Type selected in the general parameters noted above.

In any event, the LME result generator stage 306 may output a plurality of bytes in a format that comports with a selected standard format. For example, the standard format may include the Telecordia format as previously discussed. In this example, the format may be in a so-called ".SOR" format. In this case, the plurality of bytes may include a representation of the values summarized above in Table 1 and Table 2 along with the gain/distance values. Each of the values may be disposed at a specific location within the plurality bytes and in a format (e.g., data type) governed by the Telecordia OTDR specification. Moreover, the gain/distance values may be disposed in a plurality of blocks that may be referenced via an appropriate header/definition portion within the plurality of bytes. The LME result generator stage may output the plurality of bytes as a contiguous array of bytes.

The file output stage 308 receives the contiguous array of bytes formatted in the standard format and renders an LME output file based on the same that may be stored in a memory, e.g., a portable hard drive, a USB thumb drive, and so on. The export file stage 310 may then export the rendered LME file to a selected location. The rendered LME file may be in a ".SOR" file format and compatible with commercial utilities designed to analyze and/or display LME data.

Figure 4:
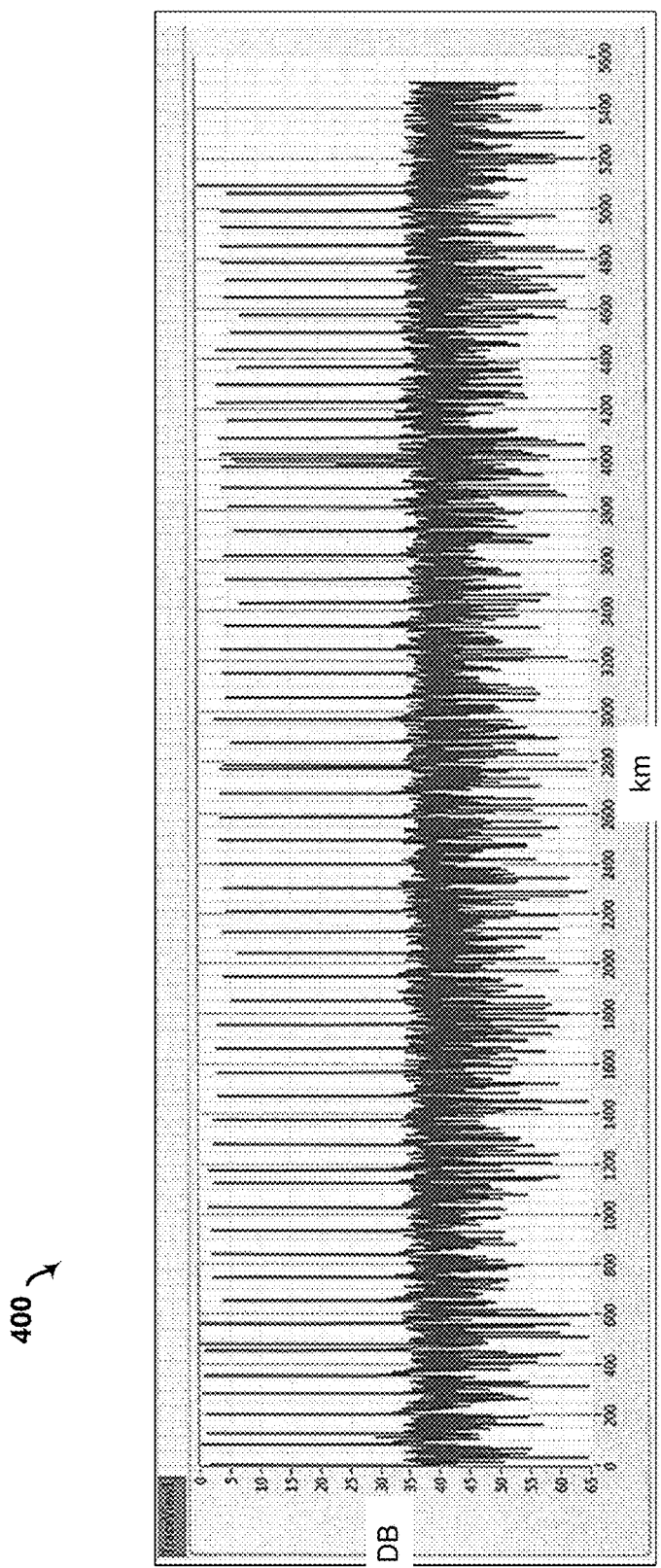
FIG. 4 includes a plot of change in measured gain vs. distance in an example communication system consistent with the present disclosure.

Turning to FIG. 4, an example plot 400 shows gain measurements vs. distance for an example WDM communication system. The plot 400 may be shown by a commercial viewer after, for example, loading the rendered LME output file exported by the export file stage 310. As shown, the example plot 400 shows change in gain relative to distance for an example optical transmission system, e.g., the system 100 of FIG. 1. As shown, the example system includes a system length of about 5000 km. Peaks and valleys shown in the plot 400 denote various events (e.g., branching units, repeaters, and so on) along an optical communication path of the system.

Figure 5:
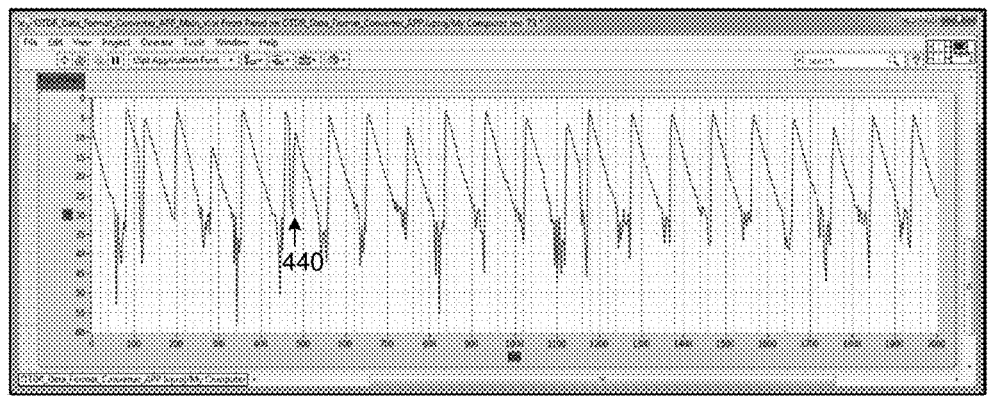
FIG. 5 shows a zoomed in portion of the plot of FIG. 4 in accordance with an embodiment of the present disclosure.
Figure 6:
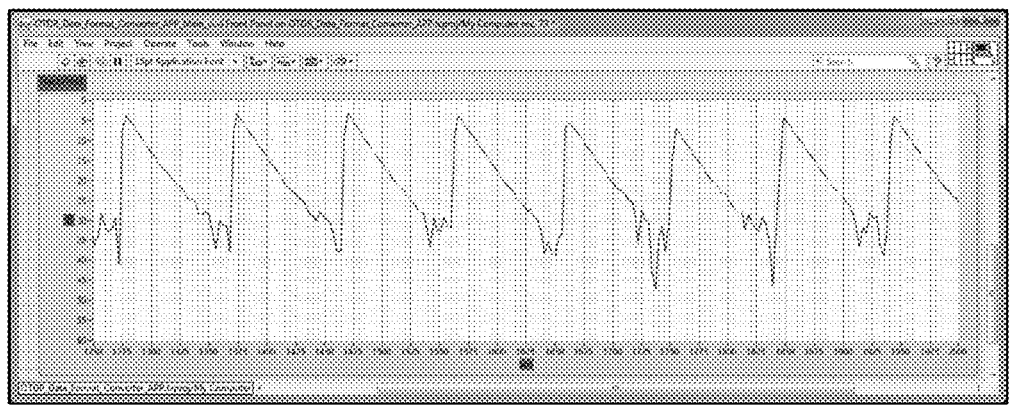
FIG. 6 shows another zoomed in portion of the plot of FIG. 4 in accordance with an embodiment of the present disclosure.

FIG. 5 shows a zoomed in region of the plot 400 of FIG. 4 to illustrate LME results over a 2 km span of the example communication system. As shown, peaks and valleys in plotted gain values denote gain imparted on an LME test signal as the same passes through components of the optical communication system. For instance, a valley 440, e.g., such as shown at about 480 km, may correlate to a drop in gain due to the presence of a branching unit. FIG. 6 illustrates a graph 600 that further zooms in to illustrate a relatively short pan from 1250 m to 2000 m of the example communication system. As shown, the system may be classified as "healthy" so long as the peaks/valleys remain within threshold limits and correspond with optical components at known locations within the communication system.

Figure 7:
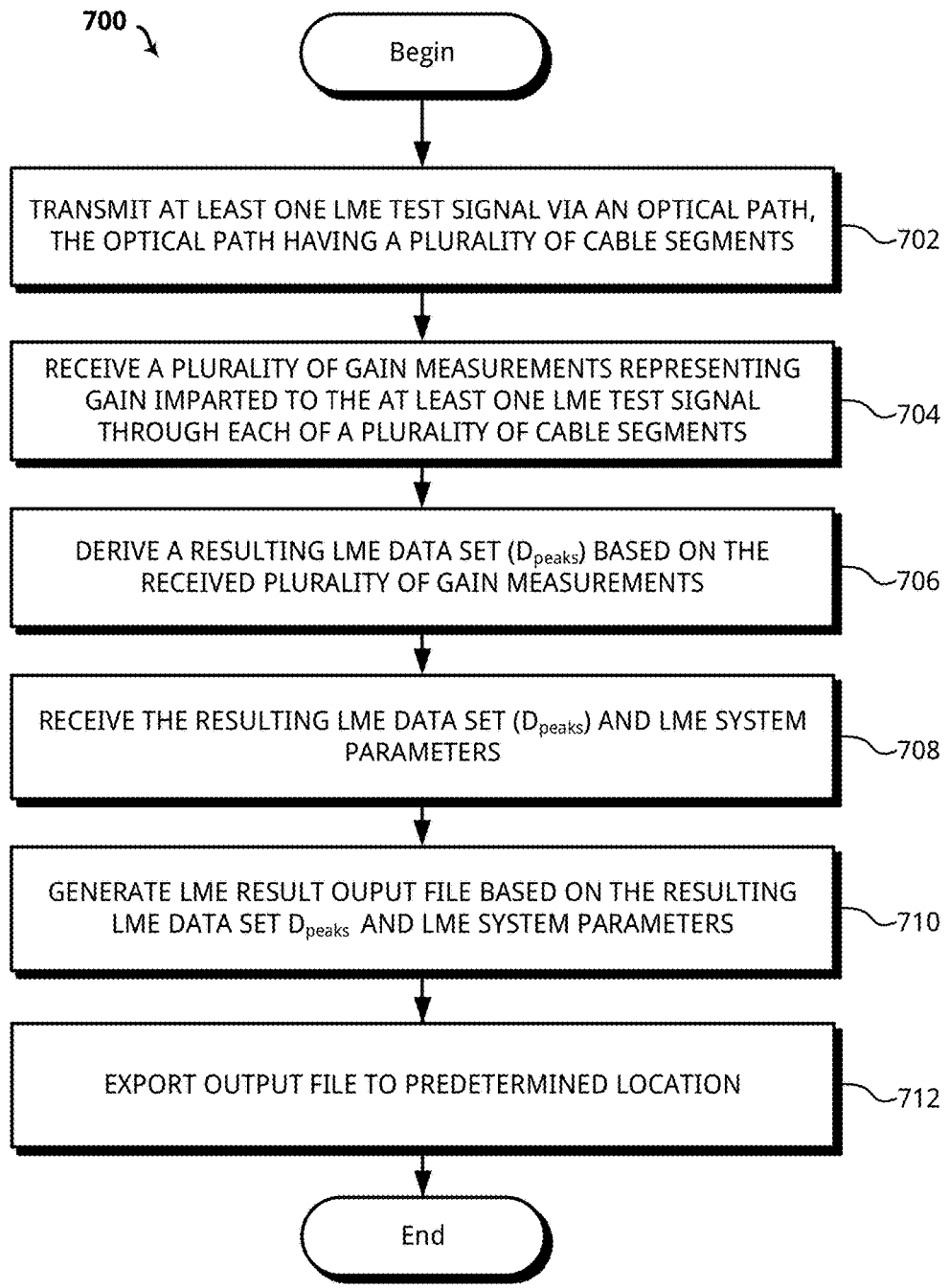
FIG. 7 is a block flow diagram illustrating one example of a process consistent with the present disclosure.

FIG. 7 is a block flow diagram of one example process 700 consistent with the present disclosure. The example process 700 may be performed by, for example, the LME controller 202 of FIG. 1 that implements the plurality of LME processing stages 300 of FIG. 3. The illustrated block flow diagram includes a particular sequence of acts. It can be appreciated, however, that the sequence of acts merely provides an example of how the general functionality described herein can be implemented. Further, each sequence of acts does not have to be executed in the order presented unless otherwise indicated.

In the example embodiment illustrated in FIG. 7, at least one LME test signal is transmitted 702 at a nominal channel wavelength via an optical path (e.g., optical path 110/120), the optical path having a plurality of cable segments. A plurality of gain measurements representative of gain imparted to a test signal through each of a plurality of cable segments may be received 704. Each gain measurement may be performed at a predetermined rate, such as at 100 picosecond increments as previously discussed, although other embodiments are within the scope of this disclosure. The plurality of gain measurements may be filtered and normalized 706 to derive a resulting LME data set ($D_{peaks}$).

The resulting LME data set ($D_{peaks}$) and LME system parameters may be received 708 by the LME controller 202, for example. An output file, e.g., a .SOR file in accordance with the Telecordia format, may be generated 710 based on the resulting LME data set ($D_{peaks}$) and the LME system parameters. An output file may be exported 712 to a predetermined location, e.g., a network location, USB drive, portable hard drive, and so on.

Further Example Aspects

In accordance with an aspect of the present disclosure an optical communication system is disclosed. The optical communication system comprising an optical path comprising a plurality of cable segments, a terminal station with line monitoring equipment (LME) coupled to the optical path, the LME being configured to, transmit at least one LME test signal along the optical path, receive a plurality of gain measurements representing gain imparted to the at least one LME test signal through each of the plurality of cable segments, derive a resulting LME data set based on the received plurality of gain measurements, receive a plurality of system parameters associated with the optical communication system, and generate an output file based at least in part on the resulting LME data set and the system parameters associated with the optical communication system.

In accordance with another aspect of the present disclosure a method of performing line tests via line monitoring equipment (LME) of a wavelength division multiplexed (WDM) system is disclosed. The method comprising transmitting at least one LME test signal along an optical path of the wavelength division multiplexed (WDM) communication system, the optical path comprising a plurality of cable segments, receiving a plurality of gain measurements representing gain imparted to the at least one LME test signal through each of the plurality of cable segments, deriving a resulting LME data set based on the received plurality of gain measurements, receiving a plurality of system parameters associated with the WDM communication system, and generating an output file based at least in part on the resulting LME data set and the system parameters associated with the WDM communication system.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor/controller, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical communication system, the optical communication system comprising:
an optical path comprising a plurality of cable segments;

a terminal station with line monitoring equipment (LME) coupled to the optical path, the LME being configured to:
- transmit a plurality of LME test signals along the optical path;
- receive a plurality of gain measurements representing gain imparted to the plurality of LME test signals through each of the plurality of cable segments;
- derive a resulting LME data set based on the received plurality of gain measurements, wherein deriving the resulting LME data set further includes averaging a predetermined number of data sets associated with each of the plurality of LME test signals, and wherein the predetermined number of data sets is selected based at least in part on a length of the optical path;
- receive a plurality of system parameters associated with the optical communication system; and
- generate an output file based at least in part on the resulting LME data set and the system parameters associated with the optical communication system.

2. The optical communication system of claim 1, wherein each of the LME test signals are transmitted at a predetermined interval.

3. The optical communication system of claim 1, wherein the predetermined number of data sets is based at least in part on spatial resolution of each LME test signal and a byte length of each LME test signal.

4. The optical communication system of claim 1, wherein the generated output file is in a format that comports with Telecordia SR-4731.

5. The optical communication system of claim 1, wherein the system parameters comprise hardware parameters associated with the LME, the hardware parameters comprising at least one of an acquisition range, pulse width parameter, backscatter coefficient and/or noise floor level.

6. The optical communication system of claim 1, wherein the plurality of LME test signals are associated with a first channel wavelength, and wherein the received plurality of system parameters include a nominal wavelength value representing the first channel wavelength.

7. The optical communication system of claim 1, wherein the received plurality of system parameters include a fiber type value representing a type of fiber implemented within the plurality of cable segments.

8. The optical communication system of claim 1, wherein the received plurality of system parameters comprise at least one of a user-defined system name, a user-defined originating terminal location, and/or user-defined terminating terminal location.

9. A method of performing line tests via line monitoring equipment (LME) of a wavelength division multiplexed (WDM) communication system, the method comprising:
- transmitting a plurality of LME test signals along an optical path of the WDM communication system, the optical path comprising a plurality of cable segments;
- receiving a plurality of gain measurements representing gain imparted to the plurality of LME test signals through each of the plurality of cable segments;
- deriving a resulting LME data set based on the received plurality of gain measurements, wherein deriving the resulting LME data set further includes averaging a predetermined number of data sets associated with each of the plurality of LME test signals, and wherein the predetermined number of data sets is selected based at least in part on a length of the optical path;
- receiving a plurality of system parameters associated with the WDM communication system; and
- generating an output file based at least in part on the resulting LME data set and the system parameters associated with the WDM communication system.

10. The method of claim 9, wherein each of the LME test signals are transmitted at a predetermined interval.

11. The method of claim 4, wherein the predetermined number of data sets is based at least in part on spatial resolution of each LME test signal and a byte length of each LME test signal.

12. The method of claim 9, wherein the generated output file is in a format that comports with Telecordia SR-4731.

* * * * *